US010826956B2

(12) United States Patent
Lim et al.

(10) Patent No.: US 10,826,956 B2
(45) Date of Patent: *Nov. 3, 2020

(54) APPARATUS AND METHOD FOR PROVIDING CONTENT

(71) Applicant: IDEAHUB, INC., Seoul (KR)

(72) Inventors: Seong Yong Lim, Daejeon (KR); Joo Myoung Seok, Daejeon (KR); Sang Woo Ahn, Daejeon (KR); Yong Ju Cho, Daejeon (KR); Ji Hun Cha, Daejeon (KR)

(73) Assignee: IDEAHUB INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/166,492

(22) Filed: Oct. 22, 2018

(65) Prior Publication Data

US 2019/0052688 A1    Feb. 14, 2019

Related U.S. Application Data

(63) Continuation of application No. 15/488,224, filed on Apr. 14, 2017, now Pat. No. 10,122,778, which is a
(Continued)

(30) Foreign Application Priority Data

Jul. 19, 2013   (KR) .................. 10-2013-0085270
Jun. 26, 2014   (KR) .................. 10-2014-0079015

(51) Int. Cl.
*H04L 29/06*   (2006.01)

(52) U.S. Cl.
CPC ...... *H04L 65/4084* (2013.01); *H04L 65/4092* (2013.01); *H04L 65/601* (2013.01); *H04L 65/608* (2013.01)

(58) Field of Classification Search
CPC . H04L 65/4084; H04L 65/601; H04L 65/608; H04L 65/4092
See application file for complete search history.

(56) References Cited

U.S. PATENT DOCUMENTS 6,570,926 B1    5/2003   Agrawal et al.
7,340,458 B2    3/2008   Vaithilingam
(Continued)

FOREIGN PATENT DOCUMENTS

KR    10-2012-0035831 A    4/2012
KR    10-2012-0114016 A    10/2012
(Continued)

OTHER PUBLICATIONS

ETSI "Universal Mobile Telecommunications System (UMTS); LTE; Transparent end-to-end Packet-switched Streaming Service (PSS); Protocols and codecs," *European Telecommunications Standards Institute*, (3GPP TS 26.234 version 9.3.0 Release 9). Jun. 2010, France, pp. 1-186 (In English).
(Continued)

*Primary Examiner* — Patrice L Winder
(74) *Attorney, Agent, or Firm* — One LLP

(57) ABSTRACT

A method of receiving content in a client is provided. The method may include receiving, from a server, a spatial set identifier (ID) corresponding to a tile group including at least one tile, sending, to the server, a request for first content corresponding to metadata, and receiving, from the server, the first content corresponding to the request.

11 Claims, 7 Drawing Sheets

Related U.S. Application Data continuation of application No. 14/333,892, filed on Jul. 17, 2014, now Pat. No. 9,628,528.

(56) References Cited

U.S. PATENT DOCUMENTS

| | | | |
|---|---|---|---|
| 7,447,792 B2 | 11/2008 | Brun | |
| 7,581,027 B2 | 8/2009 | Boliek et al. | |
| 8,319,825 B1 | 11/2012 | Urbach | |
| 8,331,760 B2* | 12/2012 | Butcher | H04N 21/23431 |
| | | | 382/256 |
| 8,351,513 B2 | 1/2013 | Wen et al. | |
| 8,494,341 B2 | 7/2013 | Azulai et al. | |
| 8,645,562 B2 | 2/2014 | Thang et al. | |
| 8,694,669 B2 | 4/2014 | Park et al. | |
| 8,918,533 B2 | 12/2014 | Chen et al. | |
| 8,924,582 B2 | 12/2014 | Giladi | |
| 8,949,451 B2* | 2/2015 | Einarsson | H04N 21/6125 |
| | | | 709/231 |
| 9,015,468 B2 | 4/2015 | Wang et al. | |
| 9,135,338 B2 | 9/2015 | Yates | |
| 9,161,013 B2* | 10/2015 | Oyman | H04W 76/16 |
| 9,191,429 B2* | 11/2015 | Fall | H04L 65/608 |
| 9,258,530 B2* | 2/2016 | Denoual | H04N 7/17336 |
| 9,258,622 B2 | 2/2016 | Youenn et al. | |
| 9,313,242 B2* | 4/2016 | Mann | H04L 65/60 |
| 9,361,320 B1 | 6/2016 | Vijendra et al. | |
| 9,384,619 B2 | 7/2016 | Erol et al. | |
| 9,390,274 B2 | 7/2016 | Zhang et al. | |
| 9,419,973 B2* | 8/2016 | Oyman | H04L 63/0876 |
| 9,444,863 B2* | 9/2016 | Rehan | H04L 65/60 |
| 9,510,029 B2* | 11/2016 | Hurst | H04N 5/783 |
| 9,628,533 B2* | 4/2017 | Denoual | H04N 21/845 |
| 9,646,162 B2* | 5/2017 | Giladi | H04N 21/2347 |
| 9,699,465 B2* | 7/2017 | Ouedraogo | H04N 19/159 |
| 9,712,874 B2* | 7/2017 | Kim | H04N 21/2381 |
| 9,723,047 B2* | 8/2017 | Van Brandenburg | H04L 65/4084 |
| 9,749,375 B2* | 8/2017 | Wang | H04N 21/8456 |
| 9,794,649 B2 | 10/2017 | Denoual | |
| 9,860,293 B2* | 1/2018 | Thang | H04L 65/601 |
| 9,860,572 B2* | 1/2018 | van Deventer | H04L 29/06 |
| 9,883,011 B2* | 1/2018 | Denoual | H04L 67/42 |
| 10,178,140 B2* | 1/2019 | Reznik | H04L 65/60 |
| 2003/0031260 A1 | 2/2003 | Tabatabai et al. | |
| 2003/0208473 A1 | 11/2003 | Lennon | |
| 2006/0167876 A1 | 7/2006 | Benitez | |
| 2012/0147265 A1 | 6/2012 | Gu et al. | |
| 2012/0185607 A1 | 7/2012 | Rhyu et al. | |
| 2013/0101035 A1 | 4/2013 | Wang et al. | |
| 2013/0159546 A1 | 6/2013 | Thang et al. | |
| 2014/0089990 A1 | 3/2014 | Van Deventer | |
| 2014/0146877 A1* | 5/2014 | Delegue | H04N 21/23418 |
| | | | 375/240.02 |
| 2014/0359081 A1 | 12/2014 | Van Deventer | |
| 2015/0032901 A1 | 1/2015 | Wang et al. | |

FOREIGN PATENT DOCUMENTS

| | | |
|---|---|---|
| KR | 10-2013-0063413 A | 6/2013 |
| KR | 10-2013-0068234 A | 6/2013 |
| WO | WO 2012/168365 A1 | 12/2012 |

OTHER PUBLICATIONS

3GPP "3rd Generation Partnership Project; Technical Specification Group Services and System Aspects Transparent end-to-end Packet-switched Streaming Service (PSS); Progressive Download and Dynamic Adaptive Streaming over HTTP (3GP-DASH)," *3GPP Organizational Partners*, (Release 10) Aug. 2010, France, pp. 1-34 (In English).

KR, 10-2014-0079015 Office Action, dated May 28, 2020.

* cited by examiner

FIG. 1B

| 1 | 8 | 9 | 16 | 17 | 24 |
|---|---|---|----|----|----|
| 2 | 7 | 10 | 15 | 18 | 23 |
| 3 | 6 | 11 | 14 | 19 | 22 |
| 4 | 5 | 12 | 13 | 20 | 21 |

APPARATUS AND METHOD FOR PROVIDING CONTENT

CROSS-REFERENCE TO RELATED APPLICATIONS

This application claims the benefit of Korean Patent Application No. 10-2013-0085270 and of Korean Patent Application No. 10-2014-0079015, respectively filed on Jul. 19, 2013 and Jun. 26, 2014, in the Korean Intellectual Property Office, the disclosures of which are incorporated herein by reference.

BACKGROUND

1. Field of the Invention

The present invention relates to a technology for providing streaming content, and more particularly, to an apparatus and method for providing media content using adaptive streaming.

2. Description of the Related Art

Streaming is one of schemes for transmitting and playing back multimedia content such as sounds, moving images, and the like. A client may play back content while receiving the content through the streaming.

An adaptive streaming service refers to providing a streaming service employing a communication scheme with a request of a client and a response of a server corresponding to the request.

The client may request a media sequence suitable for an environment of the client (for example, a transmission channel of the client), using the adaptive streaming service. The server may provide a media sequence matched to the request of the client among media sequences with various qualities that are included in the server.

The adaptive streaming service may be provided based on various protocols.

A Hypertext Transfer Protocol (HTTP) adaptive streaming service refers to an adaptive streaming service provided based on an HTTP. A client of the HTTP adaptive streaming service may receive content from a server using the HTTP, and may transmit a request associated with a streaming service to the server.

Currently, a method of streaming a moving image while downloading the moving image using a Transmission Control Protocol (TCP) or an HTTP is widely used. In a Moving Picture Experts Group (MPEG), that is, a standardization group that sets standards for moving images, a method of streaming a moving image while downloading the moving image using an HTTP through a project called "Dynamic Adaptive Streaming over HTTP (DASH)" has been standardized. An existing TCP- or HTTP-based moving image transmission method, and a method of classifying a single program into segments divided in a unit of time, sequentially downloading the segments and playing back the program in an MPEG-DASH are used. In the above process, an appropriate bandwidth or a type of moving images may be selected based on an environment of a terminal or a network.

SUMMARY

According to an aspect of the present invention, there is provided a method of receiving content in a client, including: receiving, from a server, a spatial set identifier (ID) for a group of at least one spatial object; sending, to the server, a request for first content corresponding to the spatial set ID; and receiving, from the server, the first content corresponding to the request.

The spatial set ID may be used to identify a tile group including at least one of tiles into which full-frame video is spatially divided.

The first content may be video corresponding to the tile group.

The spatial set ID may be used to group sets of the at least one spatial object.

The receiving of the spatial set ID may include receiving metadata including the spatial set ID.

The metadata may be a Media Presentation Description (MPD) of content.

The MPD may include a Spatial Relationship Description (SRD).

The SRD may include at least one of the spatial set ID, and an x-axis position, a y-axis position, a width, a height, a reference spatial width, and a reference spatial height of the spatial object.

The sending of the request may include transmitting, to the server, a request including a Uniform Resource Locator (URL) corresponding to the first content.

The URL may include a URL corresponding to one of tiles into which full-frame video is spatially divided.

According to another aspect of the present invention, there is provided a method of transmitting content in a server, including: transmitting, to a client, a spatial set ID for a group of at least one spatial object; receiving, from the client, a request for first content corresponding to the spatial set ID; and transmitting, to the client, the first content corresponding to the request.

The spatial set ID may include at least one of tiles into which full-frame video is spatially divided.

The first content may be video corresponding to a tile group.

The spatial set ID may be used to group sets of the at least one spatial object.

The transmitting of the spatial set ID may include transmitting metadata including at least one of the spatial set ID, and an x-axis position, a y-axis position, a width, a height, a reference spatial width, and a reference spatial height of the spatial object.

The metadata may be an MPD of content.

The MPD may include an SRD.

The SRD may include the spatial set ID.

The receiving of the request may include receiving, from the client, a request including a URL corresponding to the first content.

The URL may include a URL corresponding to one of tiles into which full-frame video is spatially divided.

According to various embodiments, a method and apparatus for transmitting spatially divided moving image content in a unit of a spatial segment may be provided.

When streaming is performed using spatial segments into which single content is divided, a position of each of the spatial segments may be simply displayed, and a subset of spatial segments and separate index information may be provided.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 1A and 1B are diagrams illustrating spatially divided moving image content according to an embodiment;

DETAILED DESCRIPTION

Figure 1A:
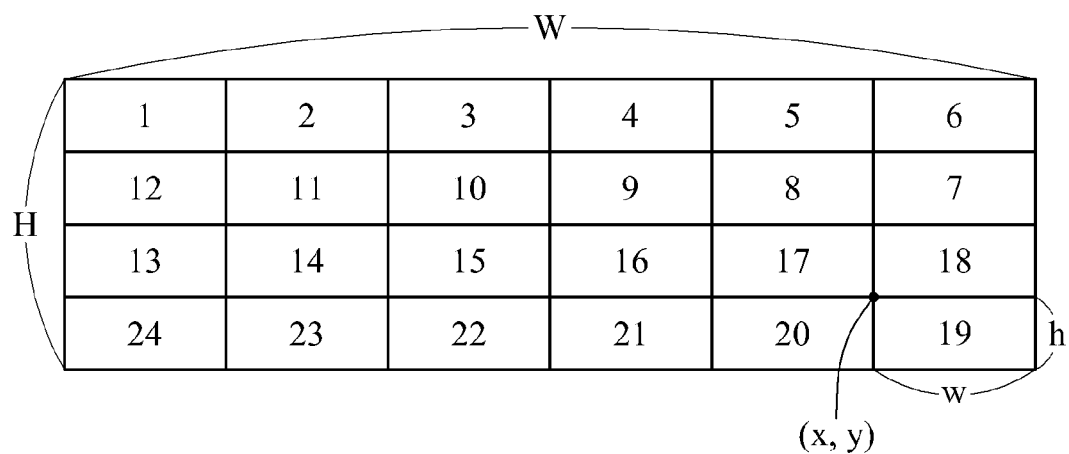

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

A Dynamic Adaptive Streaming over Hypertext Transfer Protocol (HTTP) (DASH) may specify formats that enable 1) transferring of media content from an HTTP server to an HTTP client, and 2) caching of content by standard HTTP caches.

A media component may be an encoded version of individual media types, such as audios, videos, or timed texts that have specific attributes, for example bandwidths, languages, or resolutions.

Media content may be a set of media components having a common timeline, for example audios, videos, or timed texts. Additionally, media components may have relationships on how the media components may be presented (for example, individually, jointly, or mutually exclusive) as programs or movies.

The terms "media content" and "content" may be interchangeably used with respect to each other.

A media presentation may be a structured collection of data used to establish bounded or unbounded presentation of media content including consecutive media components.

In other words, the media presentation may be a structured collection of data enabling access to a DASH client in order to provide a streaming service to a user.

A Media Presentation Description (MPD) may be a formalized description of a media presentation.

The media presentation may include possible updates of the MPD, and may be described by the MPD.

Content may be content on demand, or live content.

The content may be divided into one or more intervals. In other words, the content may include one or more intervals.

The terms "interval" and "period" may be interchangeably used with respect to each other. The term "period" may be used as a term of 3$^{rd}$ Generation Partnership Project (3GPP) adaptive HTTP streaming.

A period may be an interval of a media presentation. Consecutive sequences of all periods may form a media presentation.

In other words, the media presentation may include one or more periods.

One or more intervals may be a basic unit. One or more intervals may be described by signaling metadata. In other words, metadata may describe each of the one or more intervals.

The metadata may be an MPD.

The MPD may define a format to inform of resource identifiers (IDs) for segments. The MPD may provide a context regarding resources identified in the media presentation. The resource IDs may be HTTP-Uniform Resource Locators (URLs). URLs may be restricted by a byte range attribute.

Each interval may be divided into fragments.

The terms "fragment" and "segment" may be interchangeably used with respect to each other. The term "segment" may be used as a term of 3GPP adaptive HTTP streaming.

A segment may refer to an entity body of a response to an HTTP/1.1 GET request for an HTTP-URL, for example as defined in RFC 2616, (or a GET request for a part indicated by a byte range). The metadata may include a URL attribute, and a range attribute. A client may receive bytes designated by the range attribute from a URL indicated by the URL attribute. In other words, the bytes may be received by a partial HTTP GET command for the URL instructed by the byte range. The bytes designated by the range attribute may represent the above-described segment.

The range attribute may indicate multiple byte ranges.

The client may play back media content using the received bytes, that is, segments.

A sub-segment may refer to a smallest unit in segments that may be indexed by a segment index in a segment level.

Two or more sets of fragments corresponding to a single interval may exist. Each of the sets may be called an alternative.

The terms "alternative" and "representation (or an expression)" and "expression" may be interchangeably used with respect to each other.

Each period may include one or more groups.

Each group may include one or more representations of the same media content.

The representation may refer to a structured collection of one or more media components in a single period.

An MPD (or an MPD element) may provide descriptive information that enables a client to select one or more representations.

A Random Access Point (RAP) may be a specific location in a media segment. The RAP may be identified as a location in which playback may be started continuously from a location of the RAP based on only information included in a media segment.

Each representation may be formed of one or more segments. In other words, a representation may include one or more segments.

An MPD may be a document including metadata required to a DASH client to form appropriate HTTP-URLs in order to 1) access segments and to 2) provide a user with a streaming service. The HTTP-URLs may be absolute or relative.

The MPD may be an Extensible Markup Language (XML)-document.

The MPD may include an MPD element. The MPD may include only a single MPD element.

A client may be a DASH client.

The DASH client may be compatible with a client specified in RFC 2616.

The DASH client may typically use an HTTP GET method or an HTTP partial GET method, as specified in RFC 2616, to access segments or parts of segments.

FIGS. 1A and 1B are diagrams illustrating spatially divided moving image content according to an embodiment.

As shown in FIGS. 1A and 1B, single content may be spatially divided into 24 segments. In the following description, segments may be referred to as "tiles" or "pieces." A segment ID may be assigned to each of segments.

A spatial relationship may be defined. The spatial relationship may be associated with video representing a spatial part of full-frame video. The spatial part may be an interest region or a tile that is described with terms "position" and "size." The above description may be expressed with a term "adaptation," and may provide additional selection for a client.

Additionally, a spatial relationship description (SRD) may be defined. The SRD may allow media presentation authors to express spatial relationships between spatial objects. A spatial object may be represented by either an adaptation set or a sub-presentation. The spatial relationship may express video representing a spatial part of full-frame video. In FIGS. 1A and 1B, video representing a spatial part of full-frame video, or a group of video representing a spatial part may be referred to as a "spatial object." To preserve compatibility with legacy clients, MPD authors may use SupplementalProperty and EssentialProperty so that at least one Representation may be interpreted by legacy clients after discarding an element including EssentialProperty.

A DASH client may recognize an SRD, and may select a full-frame representation or a spatial part of the full-frame representation using an SRD annotation to meet requirements. Accordingly, a bandwidth and computation of a client may be reduced, which may be caused by preventing full-frame fetching, decoding and cropping.

In an embodiment, when a size occupied by each spatial segment is identical, a number of columns of a spatial segment, a number of rows of a spatial segment, and a scheme of arranging spatial segments may be described, and an ID enabling verification of a simple numeral or order may be described in a spatial segment description unit.

For example, 24 spatial segments of FIGS. 1A and 1B may be arranged using a horizontal raster scan scheme or a vertical raster scan scheme. In this example, information regarding a number of columns of a spatial segment, a number of rows of a spatial segment, and a direction in which spatial segments are arranged may be actually transferred.

For example, coordinates (x, y) of a top left vertex of a tile with a tile ID of 19 of FIG. 1A, a width w and a height h of the tile, and a width W and a height H of full-frame video may be included in an SRD, and may be referred to as "SRD parameters." Additionally, the SRD may include an ID of a source including a tile or full-frame video.

A parameter source_id may provide a unique ID for a source of content, within a Period. The parameter source_id may implicitly define a coordinate system associated with the source. The coordinate system may include an arbitrary origin (0; 0), an x-axis may be oriented from left to right, and a y-axis may be oriented from top to bottom. All SRD sharing the same value of the parameter source_id may have the same origin and axes orientations. Spatial relationships for spatial objects using an SRD with different values of the parameter source_id may not be defined.

Additionally, parameters x and y may express two-dimensional (2D) positions of a related spatial object in the coordinate system associated with the source. Parameters w and h may express 2D sizes of the related spatial object in the coordinate system associated with the source. Values of the parameters x, y, w, and h may be relative to values of parameters W and H. Positions (x, y) and sizes (w, h) of SRD sharing the same value of the parameter source_id may be compared after taking into account a size of a reference space, i.e., after the values of the parameters x and w are divided by the value of the parameter W and the values of the parameters y and h are divided by the value of the parameter H.

Different values of W and H may be used in different descriptors to provide position and size information in different units.

A group ID may be defined. The group ID may be an ID indicating a group including tiles included in a basic view based on a user's request or at beginning of playback of content, and will be further described below. The group ID may be referred to as "spatial_set_id." In the present description, the spatial_set_id may be interchangeably used with respect to the group ID, however, may also be defined as an ID for a group of spatial objects.

Figure 2:
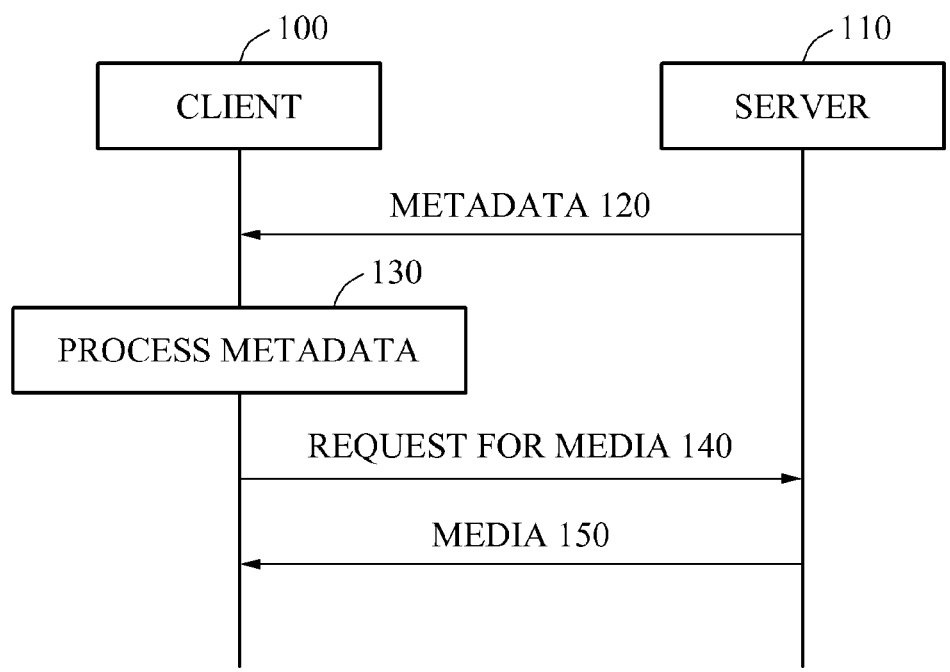
FIG. 2 is a flowchart illustrating a signal processing process according to an embodiment.

FIG. 2 is a flowchart illustrating a signal processing process according to an embodiment.

As shown in FIG. 2, a client 100 and a server 110 may communicate with each other. The client 100 may be a DASH client. The DASH client may be compatible with a client specified in RFC 2616.

The DASH client may typically use an HTTP GET method or an HTTP partial GET method, as specified in RFC 2616, to access segments or parts of segments.

The server 110 may perform hosting on DASH segments. The server 110 may be compatible with a server specified in RFC 2616.

In operation 120, the client 100 may receive, from the server 110, 1) metadata of content, or 2) metadata of a specific interval of the content. In other words, the server 110 may transmit, to the client 100, 1) the metadata of the content, or 2) the metadata of the specific interval of the content. The specific interval may indicate a currently processed interval among one or more intervals forming the content.

The metadata may be an MPD of media content. Additionally, the MPD may include an SRD, and the SRD may include at least one of a group ID and a tile ID. The group ID may be an ID indicating a group including tiles included in a basic view based on a user's request or at beginning of playback of content. In other words, the group ID may be an ID used to group sets of spatial representations. For example, in an SRD as shown in FIG. 1A, a tile group with a group ID of "0" may be set to include tiles with tile IDs of 15, 16, 21, and 22. Additionally, a tile group with a group ID of "1" may be set to include tiles with tile IDs of 11, 12, 17, and 18. The group ID may be set to "0" or a natural number.

Content represented by either an adaptation set or a sub-representation may be defined as a spatial object. The group ID may also be defined as an ID for a group of spatial objects.

For example, in operation 120, the client 100 may receive metadata including the group ID of "1" from the server 110.

In operation 130, the client 100 may process the metadata of the specific interval. For example, the client 100 may verify the group ID, and may verify content to be received.

In operation 140, the client 100 may send a request for content or a fragment to the server 110. The client 100 may request the server 110 to transmit content suitable for the specific interval based on the processed metadata. In other words, the requested content may be selected based on the metadata. For example, the client 100 may request for content including a tile group corresponding to the group ID. In an embodiment, the client 100 may transmit, to the server 110, a request including a URL corresponding to a tile group. The request may include a plurality of URLs. For example, the client 100 may transmit, to the server 110, a request including a URL corresponding to each of tiles with tile IDs of 11, 12, 17, and 18.

Figure 3:
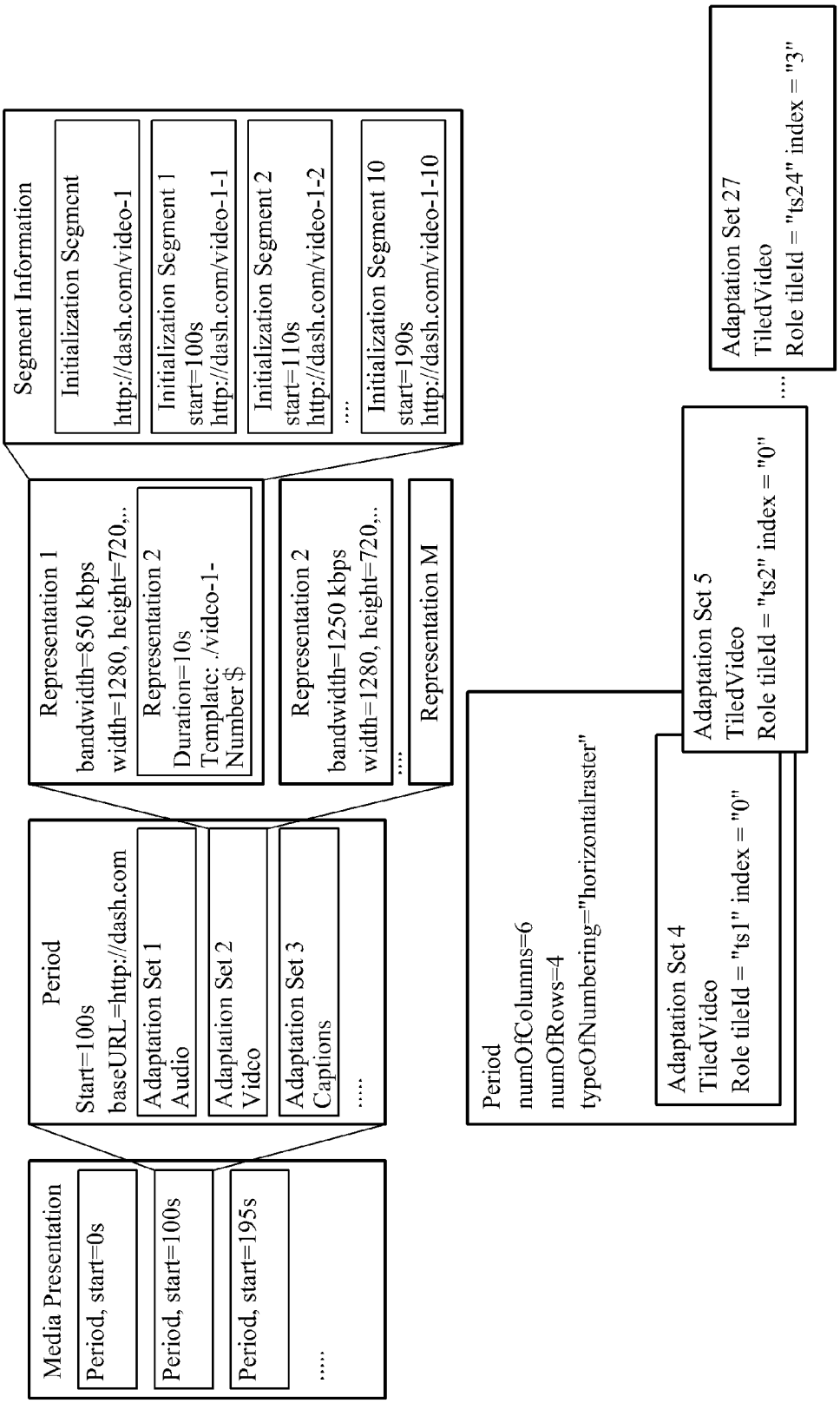
FIG. 3 is a diagram illustrating an example of a hierarchy of a spatial segment according to an embodiment.

In operation 150, the server 110 may transmit, to the client 100, content suitable for each request from the client 100. The client 100 may receive the content from the server 110. For example, the client 100 may receive tiles with tile IDs of 11, 12, 17, and 18, that is, receive a tile group.

may be added to the element Period and a tileId may be added to each adaptation set, which may enable recognition of a spatial position of a tile. Referring to FIG. 3, numOfColumns set to "6," numOfRows set to "4" and typeOfNumbering set to a horizontal raster scan scheme may be described. Semantics and XML syntax of the element Period may be represented as follows:

```
numOfColumns : number of tile columns
numOfRows : number of tile rows
typeOfNumbering : numbering or scanning type of tiles
tileId : Sequential number to indicate a tile and its position
<xs:complexType name="PeriodType">
    <xs:sequence>
        <xs:element name="BaseURL" type="BaseURLType" minOccurs="0" maxOccurs="unbounded"/>
        <xs:element name="SegmentBase" type="SegmentBaseType" minOccurs="0"/>
        <xs:element name="SegmentList" type="SegmentListType" minOccurs="0"/>
        <xs:element name="SegmentTemplate" type="SegmentTemplateType" minOccurs="0"/>
        <xs:element name="AdaptationSet" type="AdaptationSetType" minOccurs="0" maxOccurs="unbounded"/>
        <xs:element name="Subset" type="SubsetType" minOccurs="0" maxOccurs="unbounded"/>
        <xs:any namespace="##other" processContents="lax" minOccurs="0" maxOccurs="unbounded"/>
    </xs:sequence>
    <xs:attribute ref="xlink:href"/>
    <xs:attribute ref="xlink:actuate" default="onRequest"/>
    <xs:attribute name="id" type="xs:string" />
    <xs:attribute name="start" type="xs:duration"/>
    <xs:attribute name="duration" type="xs:duration"/>
    <xs:attribute name="bitstreamSwitching" type="xs:boolean" default="false"/>
    <xs:attribute name="numOfColumns" type="xs:unsignedInt" use="optional" />
    <xs:attribute name="numOfRows" type="xs:unsignedInt" use="optional" />
    <xs:attribute name="typeOfNumbering" type="xs:string" use="optional" />
    <xs:any Attribute namespace="##other" processContents="lax"/>
</xs:complexType>
```

The overall process may be performed again. For example, operation 120 may be repeatedly performed on an interval next to the specific interval.

The client 100 may play back content using fragments received by repeating operations 120 to 150.

As described above, the client 100 may receive content including partial tiles, instead of receiving full-frame video. Accordingly, a bandwidth and a computation amount may be significantly reduced.

The above-described embodiment is merely an example and accordingly, may be equally applied to a tile ID, instead of a group ID. For example, the client 100 may receive metadata including a tile ID. The client 100 may transmit a request including a URL corresponding to the tile ID to the server 110. The server 110 may transmit corresponding content to the client 100.

Hereinafter, a hierarchy of a spatial segment according to various embodiments will be described.

FIG. 3 is a diagram illustrating an example of a hierarchy of a spatial segment according to an embodiment.

As shown in FIG. 3, to display a spatial segment in an element Period of an MPD defined in a DASH, a number of columns of a spatial segment, a number of rows of a spatial segment, and a scheme of arranging spatial segments may be described, and an ID enabling verification of a simple numeral or order may be described in each spatial segment description unit, that is, an element AdaptationSet. In the following description, numOfColumns may indicate a number of columns of a spatial segment, that is, a tile, numOfRows may indicate a number of rows of a tile, and typeOfNumbering may indicate a scheme of arranging tiles. The numOfColumns, numOfRows, and typeOfNumbering In another embodiment, a method of representing a subset of spatial segments while individually describing and transferring information on a plurality of spatial segments, that is, tiles may enable variable applications. For example, to specify a spatial region as a center of a screen, a spatial segment subset may be separately provided, or a region in which an important event, for example a decisive scene in sports, occurs may be displayed. Additionally, a region as a basic view in whole space may be displayed through a spatial segment subset. To this end, subset information including a plurality of IDs of spatial segments may be separately provided, and may be a group ID.

In an example, in a DASH, a subset of tiles described as an SRD in a Period of an MPD may be displayed using a tile included in a basic view based on a user's request or at beginning of playback of content through a new element DefaultView.

Alternatively, a separate element, for example, TileGroup that is a subset of tiles may be added to the Period and accordingly, spatial segment IDs may be arranged, or SubSet among elements included in current MPD::Period may be extended. For example, ExtendedSubSet may be defined by extending an existing SubSet without invading semantic of the existing SubSet. An ID that is not included in a SubSet may be added to the ExtendedSubSet, and an existing contents attribute may be reused. A spatial segment may be represented below. Semantics and XML syntax of the spatial segment may be represented as follows:

```
       TileGroup id = 0 , contains = "15,16,21,22"
       DefaultView id = 1 , contains = "11,12,17,18"
       ExtendedSubSet id = 0 , contains = "15,16,21,22"
       ExtendedSubSet id = 1 , contains = "11,12,17,18"
<xs:complexType name="ExtendedSubsetType">
    <xs:complexContent>
        <xs:extension base="SubsetType">
            <xs:attribute name="id" type="ID" use="optional" />
        </xs:extension>
    </xs:complexContent>
</xs:complexType>
```

Figure 4:
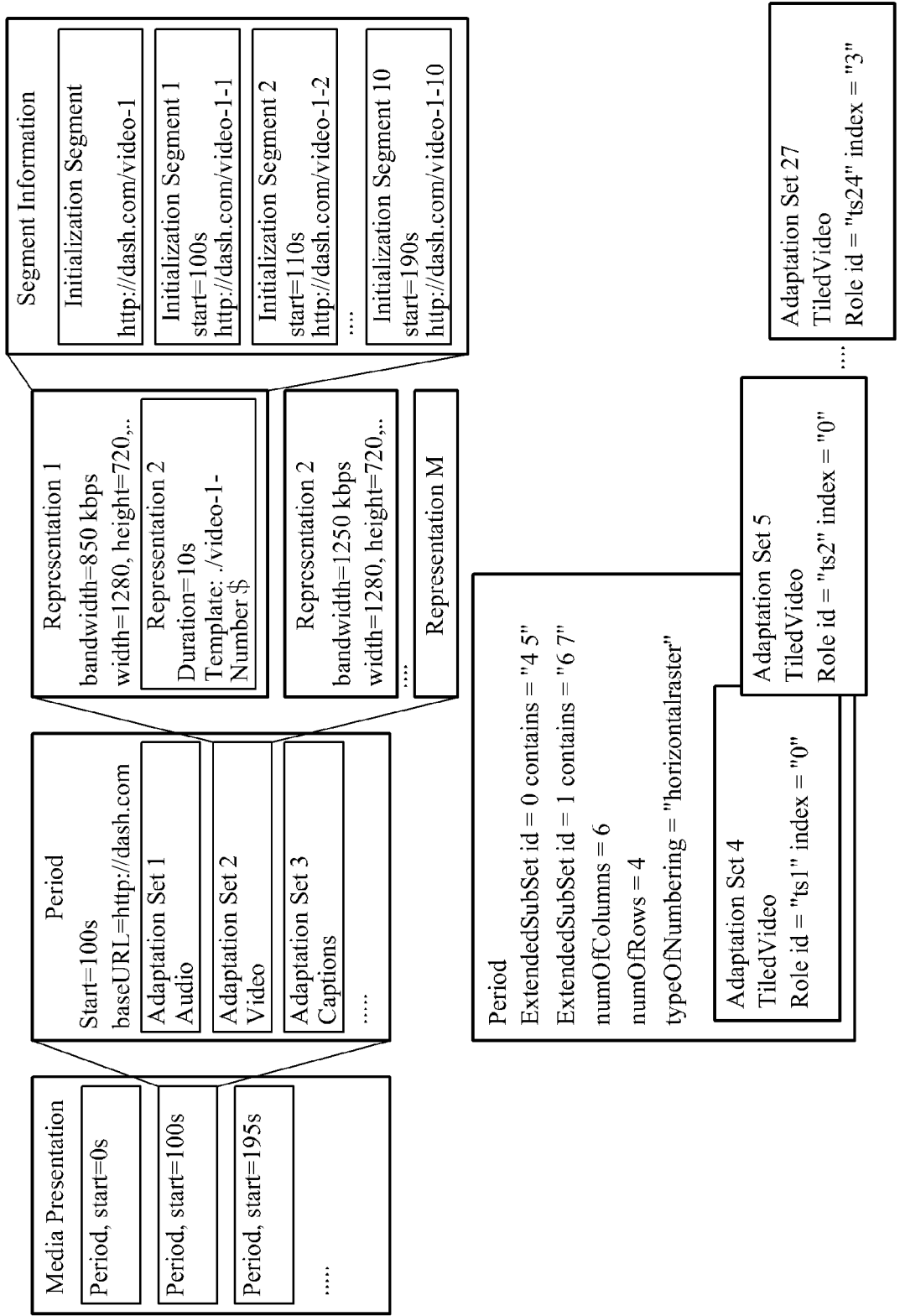
FIG. 4 is a diagram illustrating another example of a hierarchy of a spatial segment according to an embodiment.

FIG. 4 is a diagram illustrating another example of a hierarchy of a spatial segment according to an embodiment.

According to an embodiment, an index of each spatial segment may be assigned. In other words, a current spatial segment description method may have only ID information. However, the ID information may merely indicate each spatial segment, and may not be suitable for transmission of additional information of each spatial segment. For example, when separate additional information is not provided, priority information and the like may not be displayed because only position information of each spatial segment may be provided. Accordingly, there is a desire for a method of transferring separate additional information, for example priority information of spatial segments, information of the same subset, and the like. ID information of each spatial segment, and an index attribute may be independently transferred, and a reception terminal may interpret index information based on a preset method. In an example, in a Moving Picture Experts Group (MPEG)-DASH, to transfer separate additional information of each spatial segment, an index attribute may be added to each spatial segment information. A meaning of the index and a method of using the index may be set in advance between an author and a terminal. The meaning of the index may be used as priority information, and the same index may be used as a subset. Semantics and XML syntax of the spatial segment may be represented as follows:

```
       Role tileId = "ts1" index = "0"
       Role tileId = "ts2" index = "0"
              ...
       Role tileId = "ts24" index = "9"
```

Figure 5:
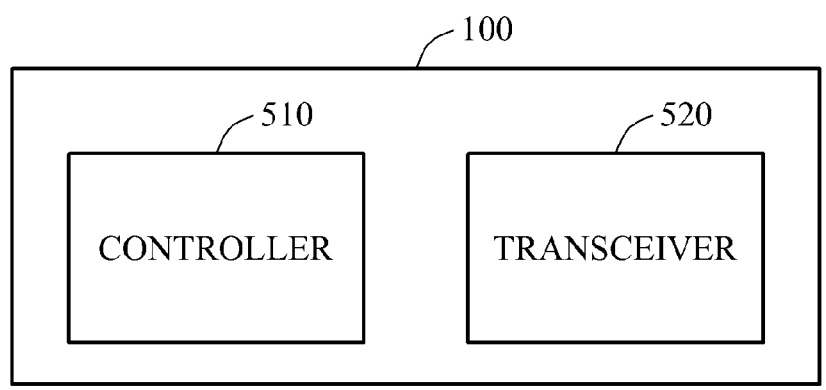
FIG. 5 is a block diagram illustrating an example of a configuration of a client according to an embodiment.

FIG. 5 is a block diagram illustrating an example of a configuration of the client 100 according to an embodiment.

A controller 510 may perform operations 130 and 140. For example, the controller 510 may process metadata of an interval, and may select content suitable for the interval based on the processed metadata.

A transceiver 520 may perform operations 120, 140, and 150. For example, the transceiver 520 may receive metadata of an interval of content from the server 110, may send a request for content suitable for the interval to the server 110, and may receive the content from the server 110.

Figure 6:
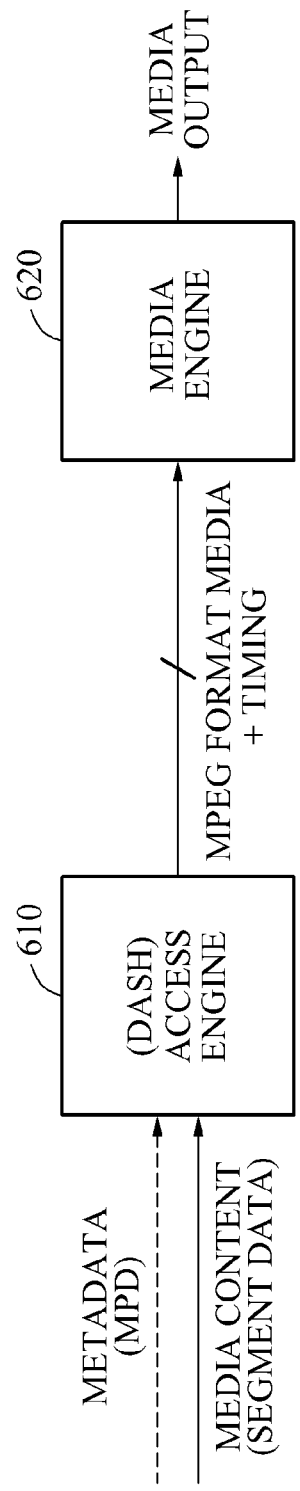
FIG. 6 is a diagram illustrating another example of a configuration of a client according to an embodiment.

FIG. 6 is a diagram illustrating another example of a configuration of the client 100 according to an embodiment.

The client 100 may include an access engine 610, and a media engine 620.

The access engine 610 may be a DASH access engine.

The access engine 610 may receive metadata (for example, an MPD) from the server 110.

The access engine 610 may form requests, and may issue the formed requests to the server 110.

The access engine 610 may receive content (for example, segments or parts of the segments) from the server 110.

The access engine 610 may provide the content to the media engine 620.

An output of the access engine 610 may include media (or a part of the media) of an MPEG container (for example, an International Organization for Standardization (ISO)/International Electrotechnical Commission (IEC) 14492-12 ISO base media file format, or an ISO/IEC 13818-2 MPEG-2 Transport Stream (TS)). Additionally, the output of the access engine 610 may include timing information used to map internal timing of the media to a timeline of a media presentation.

The media engine 610 may play back the provided content. For example, the media engine 610 may output media using the media and the timing information that are output from the access engine 610.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of providing a media content performed by a server, comprising:
   receiving, from a client, a request for a segment of the media content based on a metadata; and
   transmitting the media content to the client,
   wherein the metadata comprises information of a spatial relationship description (SRD) to express spatial relationships between spatial objects,
   wherein the SRD includes SupplementalProperty and EssentialProperty which are used to provide spatial relationship information associated to the spatial object and to preserve compatibility with legacy clients.

2. The method of claim 1, wherein the spatial object is represented by an adaptation set.

3. The method of claim 1, wherein the spatial relationship expresses video representing a spatial part of full-frame video.

4. The method of claim 1, wherein the metadata includes a spatial set id parameter.

5. The method of claim 1, wherein All SRD sharing a same source_id have the same origin and axes orientations.

6. A method for providing a media content performed by a client, comprising:
- transmitting a request for a segment of the media content based on a metadata, to a server; and
- receiving the media content from the server,
- wherein the metadata includes information of a spatial relationship description (SRD) to express spatial relationships between spatial objects,
- wherein the SRD includes SupplementalProperty and EssentialProperty which are used to provide spatial relationship information associated to the spatial object and to preserve compatibility with legacy clients.

7. The method of claim 6, wherein the spatial object is represented by an adaptation set.

8. The method of claim 6, wherein the spatial relationship expresses video representing a spatial part of full-frame video.

9. The method of claim 6, wherein the metadata includes at least one of SupplementalProperty and EssentialProperty to provide spatial relationship information associated to the spatial object.

10. The method of claim 6, wherein the metadata includes a spatial set id parameter.

11. The method of claim 6, wherein All SRD sharing a same source_id have the same origin and axes orientations.

* * * * *